United States Patent
Silly et al.

(10) Patent No.: US 8,751,070 B2
(45) Date of Patent: Jun. 10, 2014

(54) METHOD AND SYSTEM FOR PILOTING AN AIRCRAFT

(75) Inventors: Fabien Silly, Tournefeuille (FR); Pascale Louise-Babando, Toulouse (FR); Vincent Markiton, Fontenilles (FR)

(73) Assignee: Airbus Operations SAS, Toulouse (FR)

( * ) Notice: Subject to any disclaimer, the term of this patent is extended or adjusted under 35 U.S.C. 154(b) by 1115 days.

(21) Appl. No.: 12/162,467

(22) PCT Filed: Feb. 13, 2007

(86) PCT No.: PCT/FR2007/000246
§ 371 (c)(1),
(2), (4) Date: Jul. 28, 2008

(87) PCT Pub. No.: WO2007/093697
PCT Pub. Date: Aug. 23, 2007

(65) Prior Publication Data
US 2009/0177400 A1    Jul. 9, 2009

(30) Foreign Application Priority Data
Feb. 14, 2006    (FR) ...................................... 06 01280

(51) Int. Cl.
*G05D 1/06*    (2006.01)

(52) U.S. Cl.
USPC .......................... 701/5; 701/3; 701/4; 701/10

(58) Field of Classification Search
USPC ..................................... 701/3, 4, 8, 10, 11, 5
See application file for complete search history.

(56) References Cited

U.S. PATENT DOCUMENTS

| | | | | |
|---|---|---|---|---|
| 5,414,631 A * | 5/1995 | Denoize et al. | ............... | 701/301 |
| 5,864,307 A * | 1/1999 | Henley | .......... | 340/964 |
| 5,892,462 A * | 4/1999 | Tran | ............. | 340/961 |
| 6,456,940 B1 * | 9/2002 | Higgins | ............ | 701/301 |
| 6,480,120 B1 * | 11/2002 | Meunier | ............ | 340/970 |
| 7,064,680 B2 * | 6/2006 | Reynolds et al. | ........... | 340/961 |
| 2005/0258979 A1 * | 11/2005 | Artini et al. | ........... | 340/970 |
| 2005/0273249 A1 * | 12/2005 | Artini et al. | ........... | 701/120 |
| 2006/0052912 A1 * | 3/2006 | Meunier | ............ | 701/10 |
| 2007/0150170 A1 * | 6/2007 | Deker | ............ | 701/120 |
| 2007/0185652 A1 | 8/2007 | Salmon | | |
| 2008/0103643 A1 * | 5/2008 | Artini | .............. | 701/8 |

FOREIGN PATENT DOCUMENTS

| | | |
|---|---|---|
| FR | 2 864 269 | 6/2005 |
| FR | 2 864 270 | 6/2005 |
| FR | 2 870 520 | 11/2005 |

OTHER PUBLICATIONS

International Search Report dated Aug. 10, 2007 w/ English translation.
Written Opinion of the International Searching Authority with English translation.

\* cited by examiner

*Primary Examiner* — Ernesto Suarez
(74) *Attorney, Agent, or Firm* — Dickinson Wright PLLC

(57) ABSTRACT

Disclosed is a method and system for aiding the piloting of an aircraft to climb to a safety altitude situated above an existing low-height flight trajectory comprised of a lateral trajectory and a vertical trajectory, in which the safety altitude is the altitude of the aircraft that avoids collision of the aircraft with surrounding terrain. The aircraft is guided along the existing lateral trajectory of the low-height flight trajectory in a horizontal plane; and the aircraft is brought to the safety altitude by subjecting the aircraft to a climb mode in a vertical plane, which causes the aircraft to climb according to a climb slope which is greater than or equal to a maximum slope according to the existing vertical trajectory of the low-height flight trajectory.

13 Claims, 1 Drawing Sheet

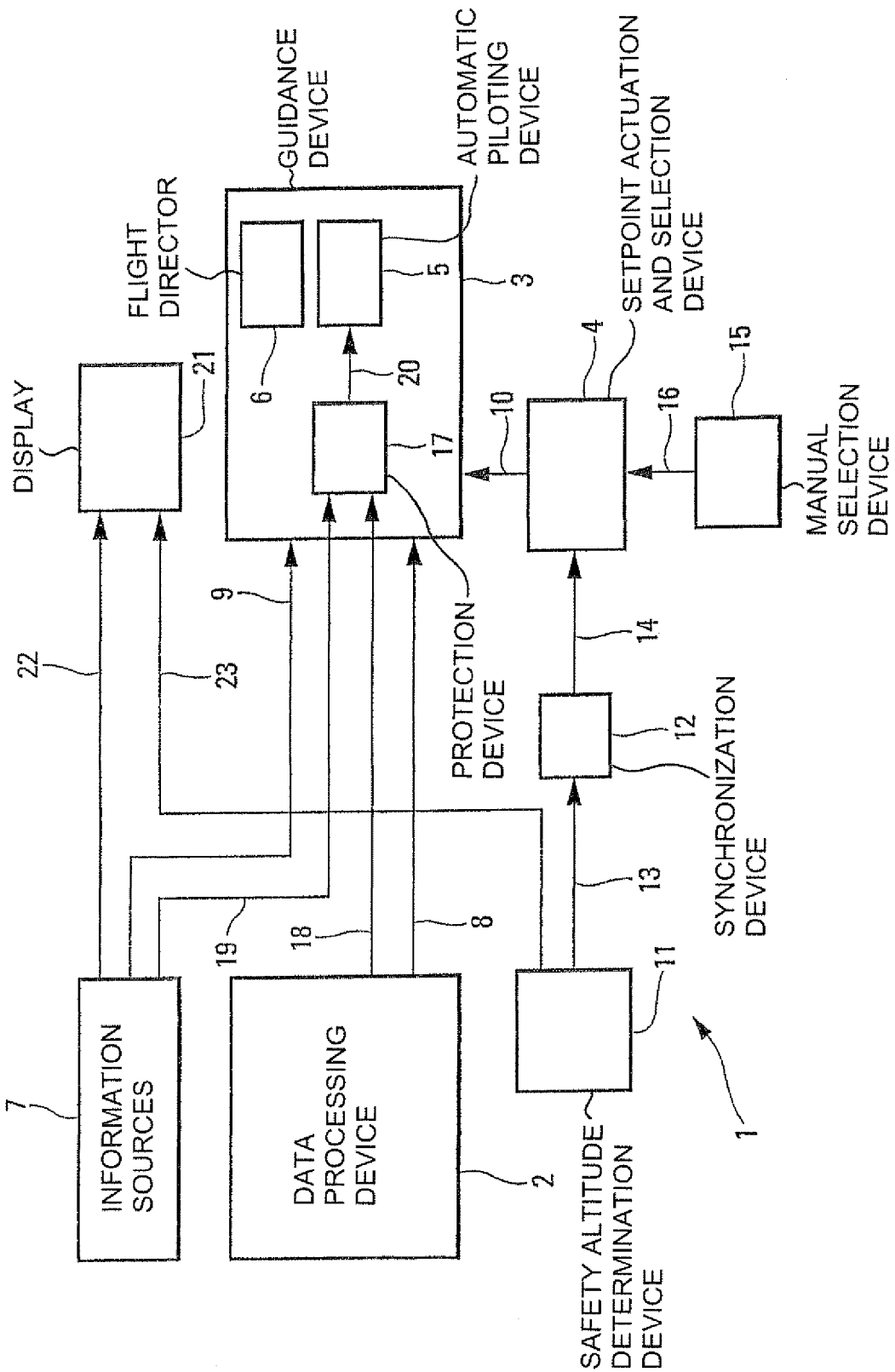

METHOD AND SYSTEM FOR PILOTING AN AIRCRAFT

FIELD OF THE INVENTION

The present invention relates to a method and a system for aiding the piloting of an aircraft which is capable of carrying out a low-height flight.

Within the framework of the present invention, the expression low-height flight is understood to mean flight along a low-height flight trajectory allowing the aircraft to follow as closely as possible the terrain overflown, in particular so as to avoid being pinpointed. A low-height flight trajectory such as this is generally situated at a predetermined terrain height, for example 500 feet (about 150 meters).

BACKGROUND OF THE INVENTION

Moreover, a low-height flight trajectory such as this is made safe with respect to the terrain, that is to say it is formed in such a way that an aircraft which follows this trajectory presents a risk of collision with the terrain overflown (that is to say directly with the ground, or else with a work or an element situated on the ground) which is almost zero, and in any event presents a probability of less than a very low predetermined value, for example $10^{-9}$. Consequently, if the aircraft is guided along a low-height flight trajectory such as this, any collision with the terrain overflown is highly improbable.

It is known that during a low-height flight in reduced visibility, cases of emergency (fault or operational requirement for example) may arise for which it is necessary to interrupt the conduct of the low-height flight and to bring the aircraft, definitively or temporarily, to a high altitude where the aircraft is safe, sheltered from a collision with the terrain (ground, work situated on the ground). This altitude is called the safety altitude. A method for determining such a safety altitude is known from document FR-04 05385.

A climb phase intended to bring the aircraft from the low-height flight trajectory to the safety altitude is not without risk. Specifically, for example climbing in a straight line, in conditions of reduced visibility, is not a satisfactory procedure, since the low-height flight is optimized to pass through the bottoms of valleys, as close as possible to the terrain overflown, and so climbing blindly in a straight line is very risky.

Moreover, the safety altitude is generally dependent on a certain geographical zone and therefore has local and limited validity. This is all the truer if this zone is small and dependent on the low-height flight trajectory, such as for example for the safety altitude determined by the method described in the aforesaid patent application FR-04 05385. In the course of the flight, the safety altitude therefore frequently varies.

Additionally, in particular in the military field, the interruption of a low-height flight is sometimes carried out in a great emergency so that any additional task requested of the crew of the aircraft, such as manually selecting a safety altitude value for example, can constitute an excessive workload in an emergency situation such as this.

SUMMARY OF THE INVENTION

The object of the present invention is to remedy these drawbacks. The invention relates to a method for aiding piloting, which makes it possible to bring in complete safety an aircraft which is flying along a low-height flight trajectory (which comprises a lateral trajectory and a vertical trajectory and which is made safe with respect to the terrain), to a safety altitude.

For this purpose, according to the invention, said method is noteworthy in that, during a flight of the aircraft along said low-height flight trajectory, when the aircraft must be brought to a safety altitude, the following operations are carried out simultaneously:

a) in a horizontal plane, the aircraft continues to be guided along the lateral trajectory of said low-height flight trajectory; and b) in a vertical plane, the aircraft is subjected to a climb mode causing the aircraft to climb according to a climb slope which is greater than or equal to the maximum slope existing on the vertical trajectory of said low-height flight trajectory.

Thus, by virtue of the invention, as the phase of climbing to the safety altitude is carried out with a climb slope which is always greater than (or equal to) the maximum slope existing on the low-height flight trajectory, the aircraft is always situated above this low-height flight trajectory. Now, the latter being formed so as to be made safe with respect to the terrain, the climb trajectory thus followed by the aircraft is therefore also made safe with respect to said terrain, that is to say with respect to the ground and to any obstacle situated on the ground. Consequently, the aircraft can attain said safety altitude in complete safety.

It will be noted that the climb trajectory is always situated above and vertically in line with the low-height flight trajectory, because of the fact that in the horizontal plane the aircraft is always guided during this climb phase along the lateral trajectory (of said low-height trajectory), and that, by definition, the low-height flight trajectory is made safe vertically only if the aircraft follows in the horizontal plane said lateral trajectory.

Additionally, in an advantageous manner, an automatic synchronization of an altitude setpoint which is capable of being used by an automatic piloting device of the aircraft, at the moment at which the aircraft is no longer guided along the low-height flight trajectory, with the current value of the safety altitude is carried out. This avoids the need for the crew to have to manage in the emergency an altitude setpoint at the level of the automatic piloting device. Thus, the standard workload, consisting in reading the value of the safety altitude and in displaying it on a man/machine interface means of the automatic piloting device, is dispensed with, in particular during the phase of climbing to a safety altitude.

However, to allow the crew to remain in charge in this situation, in an advantageous manner, said automatic synchronization is capable of being cancelled by manual selection of a particular safety altitude value by a pilot of the aircraft.

Preferably, in the horizontal plane, the aircraft continues (always) to be guided along the lateral trajectory of said low-height flight trajectory, whatever guidance mode is used, in particular during a phase of climbing to the safety altitude, a phase of maintaining such a safety altitude or a possible redescent from a safety altitude to the low-height trajectory. This characteristic presents numerous advantages, as specified below, and allows in particular the pilot to anticipate changes of value of the safety altitude. Specifically, the safety altitude generally depends on the lateral trajectory and therefore varies during the conduct of the flight. As, by virtue of the invention, the aircraft is always guided along this lateral trajectory, the pilot of the aircraft knows in advance through a display the various successive safety altitude values along this lateral trajectory. So, it is possible for him to anticipate any change of value.

Furthermore, advantageously, when the aircraft is guided along the lateral trajectory of said low-height flight trajectory, whatever the vertical guidance:

a) the current altitude of the aircraft is compared with an auxiliary altitude which is defined on the basis of the low-height flight trajectory and which represents the altitude of said flight trajectory at a lateral position corresponding to the current lateral position of the aircraft; and b) if said current altitude becomes less than or equal to said auxiliary altitude, the aircraft is flown at said auxiliary altitude along said low-height flight trajectory. This return to a low-height flight can be temporary or permanent.

Thus, protection is obtained, consisting in flying the aircraft at the higher altitude between, on the one hand, the current altitude and, on the other hand, the auxiliary altitude relating to the low-height flight trajectory which is made safe with respect to the terrain as indicated previously. This protection makes it possible to increase the safety of the flight. It can be used in any flight sequence when the aircraft is guided along the lateral trajectory of said low-height flight trajectory, whatever the vertical guidance. In particular, this protection can be implemented during a phase of following a safety altitude comprising a maintaining of the safety altitude or a change of safety altitude. This protection can also be implemented during a return to a low-height flight so as to capture and maintain the low-height flight trajectory.

The present invention also relates to a system for aiding the piloting of an aircraft, of the type comprising:
 data processing means, for determining a low-height flight trajectory:
  which comprises a lateral trajectory defined in a horizontal plane and a vertical trajectory defined in a vertical plane; and
  which is made safe with respect to the terrain;
 guidance means which comprise for example an automatic piloting device and/or a flight director, which are capable of guiding the aircraft along said flight trajectory, and which are also capable of bringing it to a safety altitude; and
 setpoint actuation and selection means allowing a pilot of the aircraft to manually control at least one climb mode and to select a guidance objective (such as for example the desired final altitude).

According to the invention, said system for aiding piloting is noteworthy in that said guidance means are formed in such a way as, when they guide the aircraft along said low-height flight trajectory and a climb mode is controlled by way of said actuation means:
 in the horizontal plane, to continue to guide the aircraft along the lateral trajectory of said low-height flight trajectory; and
 in the vertical plane, to subject the aircraft to a climb mode causing the aircraft to climb according to a climb slope which is greater than or equal to the maximum slope existing on the vertical trajectory of said low-height flight trajectory.

In a particular embodiment, said guidance means comprise an automatic piloting device, and said system for aiding piloting comprises moreover:
 first means for determining a current value of the safety altitude; and
 second means for allowing, then carrying out an automatic synchronization of an altitude setpoint capable of being used by said setpoint actuation and selection means, with the current value of the safety altitude determined by said first means, doing so at the moment at which the aircraft is no longer guided along the low-height flight trajectory.

Moreover, advantageously, said system for aiding piloting comprises a manual selection means allowing a pilot of the aircraft to cancel the effect of said second means by manual selection of a particular altitude value.

Furthermore, advantageously, said guidance means are formed so as to always guide the aircraft, in the horizontal plane, along the lateral trajectory of said low-height flight trajectory.

Additionally, in a particular embodiment, said system for aiding piloting comprises, moreover, a protection means which is integrated into said guidance means and which is formed in such a way as:
 to compare the current altitude of the aircraft with an auxiliary altitude which is defined on the basis of the low-height flight trajectory and which represents the altitude of said flight trajectory at a lateral position corresponding to the current lateral position of the aircraft; and
 if said current altitude becomes less than or equal to said auxiliary altitude, to fly the aircraft at said auxiliary altitude along said low-height flight trajectory.

BRIEF DESCRIPTION OF THE DRAWINGS

The single FIGURE of the appended drawing will elucidate the manner in which the invention may be carried out. This single FIGURE is the schematic diagram of a system for aiding piloting in accordance with the invention.

DETAILED DESCRIPTION OF THE INVENTION

The system 1 in accordance with the invention and schematically represented in the FIGURE is intended to aid a pilot of an aircraft, in particular of a military transport airplane, to bring said aircraft, when it is flying along a low-height flight trajectory, in complete safety, to a safety altitude where it is by definition safeguarded from a collision with the terrain overflown.

Accordingly, said system 1 is of the type comprising:
 standard data processing means 2, in particular a flight management system for example of FMS type, which are intended to determine a low-height flight trajectory comprising a lateral trajectory defined in a horizontal plane and a vertical trajectory (or flight profile) defined in a vertical plane. This low-height flight trajectory is formed so as to allow the aircraft to follow as closely as possible the terrain overflown. Moreover, it is made safe with respect to said terrain overflown, that is to say it is formed in such a way that an aircraft which follows this trajectory presents a risk of collision with the terrain overflown (that is to say directly with the ground, or else with a work or an element situated on the ground) which is almost zero, and in any event presents a probability of less than a very low predetermined value, for example $10^{-9}$;
 guidance means 3 which are capable of guiding the aircraft along said low-height flight trajectory, determined by said means 2, and which are also capable of bringing said aircraft to a safety altitude; and
 setpoint actuation and selection means 4 which allow a pilot of the aircraft to manually control at least one particular climb mode, and to select the targeted altitude setpoint when the aircraft is guided along said low-height flight trajectory; and a set 7 of standard information sources, in particular making it possible to determine information such as the geographical position of the aircraft, its altitude, the measurements of its angles of roll and pitch, and/or the measurements of rate of acceleration in the various mechanics axes.

In a preferred embodiment, said guidance means 3 comprise the following means, not specifically represented:

- a calculation means which is intended to determine in a standard manner piloting setpoints, on the basis of information received from said means 2 by way of a link 8 and said set 7 by way of a link 9;
- at least one means for aiding piloting, for example an automatic piloting device 5 and/or a flight director 6, which determines on the basis of the piloting setpoints received from said calculation means orders for piloting the aircraft; and
- means for actuating controlled members, such as for example rudder, elevators etc. of the aircraft, to which the piloting orders thus determined are applied.

Furthermore, in a particular embodiment, said setpoint actuation and selection means 4 form, for example, part of a standard interface of the means 3, to which they are connected by way of a link 10, and allow the pilot, in addition to selecting a particular climb mode, to also select one of a plurality of different guidance modes of the aircraft, and in particular a mode of following the low-height flight trajectory.

According to the invention, said guidance means 3 are formed in such a way as, when they guide the aircraft along said low-height flight trajectory and a climb mode is controlled by way of said means 4:

- in the horizontal plane, to continue to guide the aircraft along the lateral trajectory of said low-height flight trajectory; and
- in the vertical plane, to subject the aircraft to a climb mode causing the aircraft to climb according to a climb slope which is greater than or equal to the maximum slope existing on the vertical trajectory of said low-height flight trajectory. This maximum slope can, for example, be determined by said means 2.

Thus, by virtue of the system 1 in accordance with the invention, a phase of climbing of the aircraft to a safety altitude is carried out with a climb slope which is always greater than (or equal to) the maximum slope existing on the low-height flight trajectory. Thus, the aircraft is always situated, during this climb, above said low-height flight trajectory. Now, the latter being formed by the means 2 so as to be made safe with respect to the terrain, the climb trajectory thus followed by the aircraft is therefore also made safe with respect to said terrain, that is to say with respect to the ground and to any obstacle situated on the ground. Consequently, by virtue of the invention, the aircraft can attain said safety altitude in complete safety.

It will be noted that the climb trajectory is always situated above the vertical trajectory (of the low-height flight trajectory), because of the fact that in the horizontal plane the aircraft is always guided by the guidance means 3 (during this climb phase) along the lateral trajectory (of said low-height trajectory), and that, by definition, the low-height flight trajectory is made safe vertically, only if the aircraft follows in the horizontal plane the lateral trajectory of this flight trajectory.

It will be noted that, while following the low-height flight trajectory, the means for aiding piloting of said guidance means 3 (for example the automatic piloting device 5, or the flight director 6, associated or otherwise with a means, not represented, implementing an auto-thrust mode) effects the following of the low-height flight trajectory, which is determined by the means 2, through a mode combining laws for horizontal and vertical guidance. When the pilot acts, for example, on an altitude selector of a control panel integrated into the means 4, the automatic piloting device 5 changes vertical guidance and engine thrust control law, to achieve the following objectives: thrusting of the engines to the maximum thrust and maintaining of the setpoint speed. As another possibility for the pilot, provision may be made for him to push the throttles to the maximum notch. The maximum thrust is then requested of the engines, and a speed maintenance mode and law allow the aircraft to be made to climb with the maximum rate at the current speed.

In the two previous examples, the slope obtained is always greater than or equal to that of the low-height flight trajectory determined by the means 2. In these two examples, the guidance means 3 maintain, in the horizontal plane, the slaving to the lateral trajectory, as indicated previously, thereby transferring to the climb mode the protection from which the low-height flight trajectory benefits in relation to the ground and possible obstacles.

In a particular embodiment, said system 1 comprises, moreover:

- standard means 11 for determining a current value of the safety altitude. These means 11 can determine this current value of the safety altitude, in a standard manner, on the basis of said lateral trajectory; and
- standard means 12 which are connected by way of a link 13 to said means 11 and which are formed so as to carry out an automatic synchronization of an altitude setpoint capable of being used by the setpoint actuation and selection means 4 (to which said means 12 are connected by way of a link 14) with the current value of the safety altitude determined by said means 11, doing so at the moment at which the aircraft is no longer guided along the low-height flight trajectory.

This particular embodiment avoids the need for the crew to have to manage in the emergency an altitude setpoint at the level of the setpoint actuation and selection means 4. Thus, the standard workload, consisting in reading the value of the safety altitude and in displaying it on a standard man/machine interface means of the setpoint actuation and selection means 4, is dispensed with, in particular during the phase of climbing to a safety altitude.

In a particular embodiment, said means 11 are integrated into said means 2 and said means 12 are integrated into said guidance means 3. In this case, an automatic synchronization of the value used by the setpoint actuation and selection means 4 is carried out with a value known by the means 2, for example a flight management system of the aircraft.

This automatic synchronization is armed by the crew, in anticipation of this requirement, during a low-height flight entry procedure. Accordingly, a particular arming means, not represented, (for example a push-button or an unstable position of a rotactor, such as for example a ring around a standard altitude selector which makes it possible to select the variation pitch) brings about, at the level of a display of the chosen altitude of the setpoint actuation and selection means 4, the replacement of the numerical value usually chosen by a particular wording or sign which indicates the arming of this automatic synchronization. From the moment this arming is carried out, any exit from the vertical guidance mode on the low-height flight trajectory causes the displaying in a particular altitude selection window of the current value of the safety altitude, thereby corresponding to the achieving of the aforesaid synchronization. The value thus displayed then plays the usual role of an altitude selection, in particular to condition a climb and a capture of this altitude.

Additionally, to allow the crew to remain in charge in such a situation, the system 1 in accordance with the invention comprises, moreover, a manual selection means 15 which is connected by way of a link 16 to said means 4 and which allows a pilot of the aircraft to cancel the effect of said means 12 by manual selection of a particular safety altitude value.

In a particular embodiment, said manual selection means 15 is integrated into said means 4.

Additionally, in a preferred embodiment, said guidance means 3 are also formed so as to always guide the aircraft along the lateral trajectory of said low-height flight trajectory, doing so whatever the flight phase (or the guidance mode used), be it for example a phase of climbing to a safety altitude, a phase of maintaining such a safety altitude, or a possible redescent from a safety altitude to a low-height flight trajectory. In this preferred embodiment, the pilot can anticipate changes of value of the safety altitude by virtue of display means 21 for displaying the safety altitude profile along the low-height trajectory, which display means 21 are connected to said means 7 and 11 by way of links 22 and 23. Specifically, the safety altitude generally depends on the lateral trajectory and therefore varies during the conduct of the flight. As in this preferred embodiment, the aircraft is always guided along this lateral trajectory, the pilot of the aircraft knows in advance the various successive values of the safety altitude along this lateral trajectory. Thus, it is possible for him to anticipate without any problem any change of value.

Additionally, the system 1 in accordance with the invention comprises, moreover, a protection means 17 which is integrated into the guidance means 3, which is connected by way of links 18, 19 and 20 respectively to said means 2, to said means 7 and to said automatic piloting device 5, and which is formed in such a way as:

to compare the current altitude of the aircraft, received from said means 7, with an auxiliary altitude which is received from said means 2, which is defined on the basis of the low-height flight trajectory, and which represents the altitude of said flight trajectory at a lateral position corresponding to the current lateral position of the aircraft. Accordingly, said current lateral position of the aircraft is determined beforehand in a standard manner; and as soon as said current altitude becomes less than or equal to said auxiliary altitude, to fly the aircraft at said auxiliary altitude along said low-height flight trajectory.

Thus, said protection means 17 provides protection (with respect to a risk of collision with the terrain overflown) which consists in flying the aircraft at the higher altitude between, on the one hand, the current altitude and, on the other hand, the auxiliary altitude relating to the low-height flight trajectory. This auxiliary altitude being by definition made safe with respect to the terrain as indicated previously, the protection thus obtained therefore makes it possible to increase the safety of the flight. This protection can be implemented when the aircraft is guided along the lateral trajectory of said low-height flight trajectory, whatever the vertical guidance. In particular, this protection can be implemented during a phase of following a safety altitude comprising a maintaining of the safety altitude or a change of safety altitude. This protection can also be implemented during a return to a low-height flight, so as to capture and maintain the low-height flight trajectory.

It will be noted that two implementation variants are possible, once the protection means 17 is activated, namely:

the activation of the protection causes a re-engagement of the maintenance of the low-height flight trajectory. In this case, a man/machine interface announces this re-engagement. This option is chosen by the crew, when the protection is activated, for example by pressing a low-height flight arming push-button;

the protection is reversible. It is announced at the level of the man/machine interface as temporary. In this case, the initial guidance law becomes active again when the protection is no longer necessary.

The system 1 for aiding piloting, in accordance with the invention, makes it possible to provide the crew of the aircraft, during a low-height flight, for which the three-dimensional flight trajectory is determined by a flight management system (means 2), with assistance from the guidance means 3 so as to attain if appropriate a safety altitude, to manage the conduct of the flight at this safety altitude, and if required to redescend to low height, while retaining the existing safety level for these particular flight phases, so that the low-height flight is made safe.

The invention claimed is:

1. A method for aiding the piloting of an aircraft to climb to a safety altitude situated above an existing low-height flight trajectory, in which the safety altitude is a made safe altitude that avoids collision of the aircraft with surrounding terrain, the method comprising:
    a) determining, by a data processing device, the low-height flight trajectory, wherein the determination of the low-height flight trajectory by the data processing device includes determining:
        a lateral trajectory in a horizontal plane,
        a vertical trajectory in a vertical plane, and
        a maximum slope for the vertical trajectory;
    b) guiding the aircraft, by a guidance device, along the low-height flight trajectory determined by the data processing device; and
    c) controlling the guidance device by a setpoint actuation and selection device, upon a climb command, to bring the aircraft to attain the safety altitude, by subjecting the aircraft to a climb mode in a vertical plane according to a climb slope, determined by the data processing device, which is always greater than the maximum slope of the vertical trajectory of said low-height flight trajectory, wherein the aircraft is guided along a climb trajectory in the climb mode in which the aircraft is always above the vertical trajectory of the low-height trajectory determined by the data processing device, while following the lateral path of the lateral trajectory of the low-height flight trajectory.

2. The method as claimed in claim 1, further comprising synchronizing an altitude setpoint of the setpoint actuation and selection device so that an automatic piloting device directs the low-height flight trajectory.

3. The method as claimed in claim 2, wherein said synchronization is cancelled by manual selection of a particular safety altitude value by a pilot of the aircraft.

4. The method as claimed in claim 1, wherein, during guiding the aircraft along the lateral trajectory of said low-height flight trajectory:
    a) the current altitude of the aircraft is compared with an auxiliary altitude which is defined on the basis of the low-height flight trajectory and which represents the altitude of said flight trajectory at a lateral position corresponding to the current lateral position of the aircraft; and
    b) when said current altitude becomes less than or equal to said auxiliary altitude, the aircraft is flown at said auxiliary altitude along said low-height flight trajectory.

5. A system for aiding the piloting of an aircraft to climb to a safety altitude situated above an existing low-height flight trajectory, in which the safety altitude is a made safe altitude that avoids collision of the aircraft with surrounding terrain, said system comprising:
- a data processing device for determining the low-height flight trajectory, wherein the determination of the low-height flight trajectory by the data processing device includes determining:
  - a lateral trajectory in a horizontal plane,
  - a vertical trajectory in a vertical plane, and
  - a maximum slope for the vertical trajectory;
- a guidance device configured to guide the aircraft along the lateral flight trajectory determined by the data processing device, and to guide the aircraft to the safety altitude during a climb mode to the safety altitude; and
- a setpoint actuation and selection device configured to control the guidance device, upon a climb command, to bring the aircraft to attain the safety altitude by subjecting the aircraft to the climb mode in a vertical plane according to a climb slope which is always greater than the maximum slope of the vertical trajectory of said low-height flight trajectory, wherein the aircraft is along a climb trajectory in the climb mode in which the aircraft is always above the vertical trajectory of the low-height flight trajectory determined by the data processing device, while following the lateral path of the lateral trajectory of the low-height flight trajectory.

6. The system as claimed in claim 5, wherein said guidance device comprises an automatic piloting device, controlled through said setpoint actuation and selection device, and said system further comprises:
- a device for determining a current value of the safety altitude; and
- a synchronization device that synchronizes an altitude setpoint upon actuation of said setpoint actuation and selection device to no longer guide the aircraft along the low-height flight trajectory.

7. The system as claimed in claim 6, further comprising a manual selection device allowing a pilot of the aircraft to cancel the effect of synchronization device by manual selection of a particular altitude value.

8. The system as claimed in claim 5, wherein said guidance device is formed so as to guide the aircraft, in the horizontal plane, along the lateral trajectory of said low-height flight trajectory.

9. The system as claimed in claim 8, further comprising a protection device which is integrated into said guidance device and which is formed to:
- compare the current altitude of the aircraft with an auxiliary altitude which is defined on the basis of the low-height flight trajectory and which represents the altitude of said flight trajectory at a lateral position corresponding to the current lateral position of the aircraft; and
- when said current altitude becomes less than or equal to said auxiliary altitude, fly the aircraft at said auxiliary altitude along said low-height flight trajectory.

10. An aircraft, comprising the system of claim 5.

11. A method for aiding the piloting of an aircraft to climb to a safety altitude situated above an existing low-height flight trajectory, in which the safety altitude is a made safe altitude that avoids collision of the aircraft with surrounding terrain, the method comprising:
- a) determining, by a data processing device, the low-height flight trajectory, wherein the determination of the low-height flight trajectory by the data processing device includes determining:
  - a lateral trajectory in a horizontal plane,
  - a vertical trajectory in a vertical plane, and
  - a maximum slope for the vertical trajectory;
- b) guiding the aircraft, by a guidance device, along the low-height flight trajectory determined by the data processing device; and
- c) controlling the guidance device by a setpoint actuation and selection device, upon a climb command, to bring the aircraft to attain the safety altitude by subjecting the aircraft to a climb mode in a vertical plane according to a climb slope, determined by the data processing device, which is always greater than the maximum slope of the vertical trajectory of said low-height flight trajectory, wherein the aircraft is guided along a climb trajectory in the climb mode in which the aircraft is always above the vertical trajectory of the low-height trajectory determined by the data processing device, while following the lateral path of the lateral trajectory of the low-height flight trajectory,
- wherein the aircraft's existing altitude is compared with an auxiliary altitude, which is defined on the basis of the low-height flight trajectory and which represents the altitude of the flight trajectory at a lateral position corresponding to the existing lateral position of the aircraft, and if the existing altitude is less than or equal to the auxiliary altitude, flying the aircraft at the auxiliary altitude along the low-height flight trajectory.

12. The method of claim 11, wherein the comparing the existing altitude of the aircraft with the auxiliary altitude is activated by pressing a low-height flight arming push-button.

13. The method of claim 11, wherein, when the aircraft is flown at the auxiliary altitude, the altitude of the low-height flight trajectory can be reversed to the existing altitude.

* * * * *